United States Patent [19]

Grund

[11] Patent Number: 4,600,832
[45] Date of Patent: Jul. 15, 1986

[54] METHOD AND APPARATUS FOR AUTOMATIC OPTICAL FOCUSING ON AN OPTICALLY DISCERNIBLE FEATURE ON AN OBJECT

[75] Inventor: J. Evan Grund, San Jose, Calif.

[73] Assignee: Nanometrics Incorporated, Sunnyvale, Calif.

[21] Appl. No.: 546,437

[22] Filed: Oct. 28, 1983

[51] Int. Cl.$^4$ ............................................. G03B 3/00
[52] U.S. Cl. ...................... 250/201; 250/234; 354/402
[58] Field of Search ............... 250/201 PF, 204; 234, 250/235; 356/125, 126, 375, 4; 354/402, 406, 409

[56] References Cited

U.S. PATENT DOCUMENTS

| 3,912,922 | 10/1975 | Lacotte et al. | 250/234 X |
| 4,350,884 | 9/1982 | Vollath | 250/201 PF X |
| 4,373,817 | 2/1983 | Coates | 250/234 |

OTHER PUBLICATIONS

Tucker, "Improved Critical Dimension Measurement with Computer Aided Automatic Fine Focus", MMT Proceedings, Mar. 1981.

Primary Examiner—Edward P. Westin
Attorney, Agent, or Firm—Linval B. Castle

[57] ABSTRACT

A method for the automatic fine focusing of an image scanning densitometer, micrometer, or television camera or the like, after an initial manual focus has been made on the edge of a discernible feature on the surface of an object of interest. A plurality of at least three, and preferably five, scans are made across the image of the feature at a corresponding plurality of focus positions, and the variations in light intensities are noted at each of a plurality of locations in each scan so that an edge value may be determined for each focus position. If plotted, edge values as a function of focus position appears as a second order curve of the form, edge value=$ae^2+be+c$, from which the values of the coefficients "a" and "b" may be determined by the least squares best fit method. When the derivative of the curve equation is made equal to zero to correspond to a zero slope or bottom of the curve, the best focus position is readily determined to that the precise focus may be adjusted to that position.

13 Claims, 5 Drawing Figures

METHOD AND APPARATUS FOR AUTOMATIC OPTICAL FOCUSING ON AN OPTICALLY DISCERNIBLE FEATURE ON AN OBJECT

BRIEF SUMMARY OF THE INVENTION

This invention relates generally to the automatic focusing of optical instruments and particularly to a method for achieving optimum focus on a line or the edge of an object after the operator has adjusted the optical instrument to the best apparent focus.

Several types of focusing systems have been developed for the focusing of cameras, microscopes, and other types of optical or electron optical equipment. Most systems involve two detection or measurement means, one for focusing and one for recording or measuring. In these systems the primary recording or measuring means is complemented with a secondary means for determining and adjusting the focus. Such secondary means, such as laser or sonic focusing or similar means, employ some type of optical or supersonic device for first determining focal distance, and then a means responsive to the focus determining device for actually adjusting the focal system of the instrument. Once the secondary means has been used to adjust focus, the primary detection means is used to record or measure an image. The secondary means that determines focal distance may employ only some of the optics of the microscope or camera, but does not use all the primary detection optics of the microscope or camera and is therefore susceptable to error that cannot tolerated by those systems requiring precision focusing above that normally achievable by the human eye.

A typical example of a secondary focusing system is contained a popular autofocusing instantaneous camera which, employing the principles of police radar, emits a supersonic pulse train and measures the elapsed time for return of signal to determine focal distance. A separate focusing system responsive to the measured distance then adjusts the camera focus accordingly. In another example employed in some microscope systems, a narrow laser beam is focused through the microscope optics and an optimum focus is determined by the size of the focused lased beam at the specimen surface.

While such secondary systems are generally adequate for most applications, they are not precise and are unacceptable for many applications such as those requiring precision focusing in high magnification optical systems. The accuracy of secondary systems relies upon the accuracy of the primary distance measuring device and the balancing of this measuring device with the secondary optical focusing means of the instrument. Thus, for example, an image may be properly focused on the ground glass screen of a view camera but when the film is subsequently inserted into the camera, the film emulsion may be in a slightly different plane. Or, during the short time required to adjust a microscope after laser focusing, there may be some slight movement of the specimen, hence an imbalance between primary device and the secondary means in this type of focusing system.

The fine focusing system described herein avoids the secondary type of system that first determines focal distance and subsequently adjusts the optics to that determined distance. The novel system employed by the invention uses the same optical system and image detector to both determine focal distance and detect or view the specimen. Thus, by looking at the object with the same optics used for focusing, and by focusing with a precision measuring system and not relying upon the focusing of a human operator, there can be no imbalance as discussed above and optimum focusing results.

One prior art improvement on the secondary type of automatic focusing systems, in attempting to develop a system for a fine focus adjustment after having first manually made a coarse focus adjustment, moved the stage of a scanning densitometer up or down while making multiple optical scans across a line of interest on the specimen. The optical profile, or plot of reflectance versus distance scanned, was stored in computer memory and the quality of focus was determined by measuring edge values, i.e., the steepness of the slope of an edge in the optical profile. That stage position which resulted in the lowest edge value, i.e. the steepest slope, was chosen for subsequent line-width measurements. This method was a great improvement upon the secondary type of focus measurements because the focusing was adjusted upon the actual line to be measured. But the method proved to be inaccurate for very precise focusing adjustments because the best of several fixed vertical stage positions was chosen without any consideration of the fact that the only precise or true focus will nearly always occur at some stage position between fixed positions.

The present invention is for a method of determining and locating the precise focusing position, irrespective of fixed edge value sampling stage positions, for focusing upon a sample edge or line to be actually viewed by the optical instrument. The fine focusing system of the invention may be used with any type of optical instrument requiring focusing adjustments and employing an image detector such as, but not limited to, optical or television camera systems, microscopes, or scanning densitometers. The invention will be discussed in connection with an image scanning densitometer or microscope for purposes of illustration.

Briefly described, the present invention involves the steps of first manually selecting a best initial focus upon the line to be examined or measured, measuring edge values at a plurality of fixed vertical stage positions relative to an initial position which, if plotted, can be approximately described mathematically by the second order equation, $ax^2+bx+c$, determining the values of the coefficients, a, b and c, differentiating to determine the position of "zero slope" or lowest point of the second order curve to locate the stage position for precise focus, and then vertically adjusting the stage to that determined point for precise focusing of the microscope.

DESCRIPTION OF THE DRAWINGS

In the drawings which illustrate the preferred embodiment of the invention.

DETAILED DESCRIPTION

Figure 1:
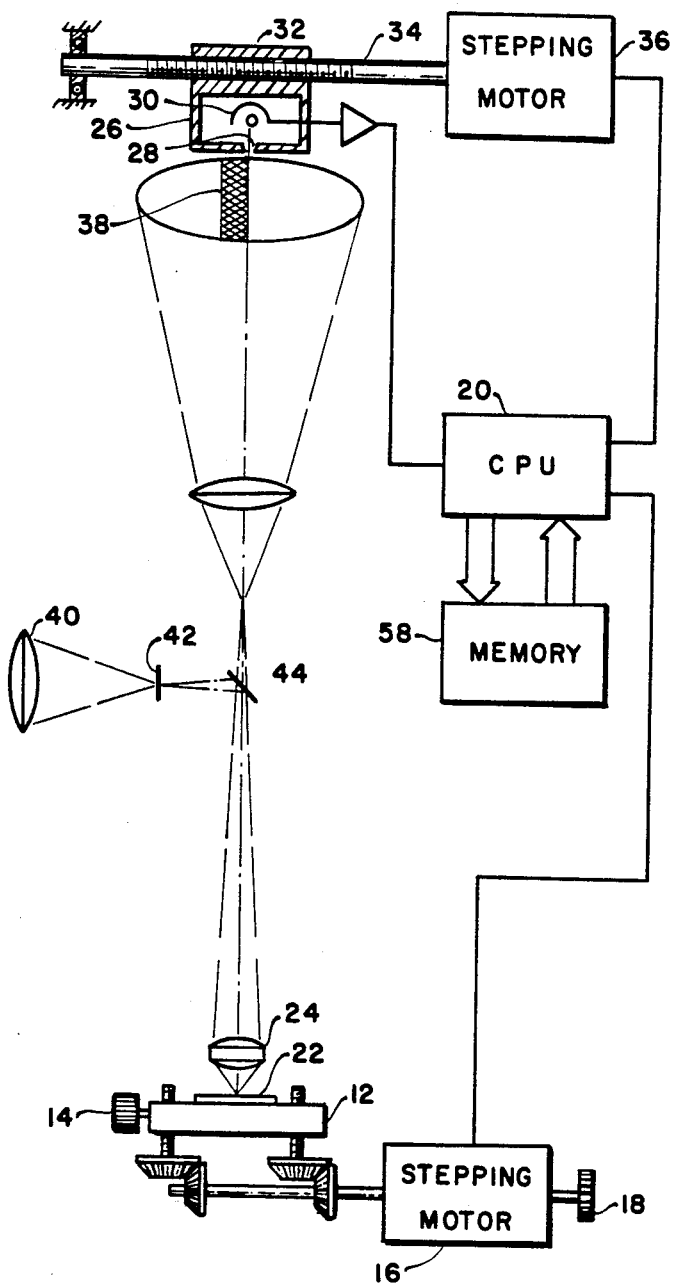
FIG. 1 is a schematic view illustrating an optical microscope, or image scanning densitometer employing the fine focusing system of the invention.

FIG. 1 is a schematic view of an optical microscope adapted for the automatic scanning and width measuring of very narrow lines such as described in U.S. Pat. No. 4,373,817, issued Feb. 15, 1983. The microscope includes a conventional specimen stage 12 adjustable in the horizontal plane in the X and Y directions by manual means such as the adjusting knob 14. The stage 12 is also adjustable in the vertical direction by a stepping motor 16 which may be manually rotated by an adjustment knob 18 and which is also adjustable by signals from a digital processor or computer 20. For some applications, it may be preferred that the specimen or object remain at a fixed position and that the motor 16 operate to vary the optics to the appropriate position with respect to the object.

A specimen 22 mounted to the stage 12 is assumed to carry very fine lines such as may be found in electronic microcircuitry or the delicate masks used in the production of such circuitry. To determine the widths of such fine lines, an optical system including an objective lens 24 focuses an image of the fine line upon the surface of a housing 26 having a narrow scanning slit 28 in front of a photodetector 30 that senses the intensity of light passing through the slit. The housing 26 is supported upon a traveling nut 32 which is driven across the projected image of the specimen by a lead screw 34 rotated by a stepping motor 36 under the control of the computer 20.

The light passing through the slit 28 is sensed by the photodetector 30 and the current signal produces therefrom is amplified and converted into digital form and is applied to the computer 20 which determines the fine line width from the scanned signals as described in the aforesaid patent. Problems exist, however, if the optical system is not perfectly focused since a slight variation from proper focus will result in a "fuzzy" image of the line edges and will make it impossible to accurately identify the edge locations, thereby leading to erroneous measurements. Therefore, it is apparent that to obtain accurate fine linewidth measurements from the system, it is imperative that the focus be as precise as possible. In the preferred embodiment, the computer 20 that determines the fine line widths also determines and adjusts the optimum focus of the optical system by using the same optics and detector used in its measurements and determinations of line widths.

FIG. 1 illustrates a typical magnified fine line 38 projected into the focal plane on the surface of the housing 26 and as may be seen by a technician making initial focusing adjustments through an optical eyepiece 40 which may be focused upon crosshairs 42 in an optical path projected toward the eyepiece by a beam splitter 44. By adjusting the vertical focusing knob 18, the edge of the fine line 38 is thus manually brought into best apparent or initial focus. But, as will be later discussed, the best initial focus is seldom the ideal or perfect focus required for accurate measurements.

Figure 2:
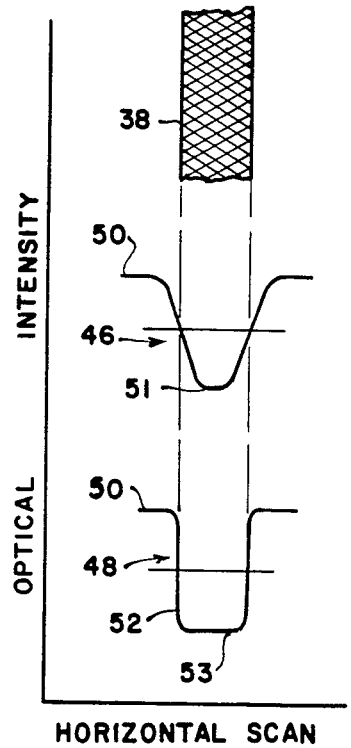
FIG. 2 are curves of measured light intensity vs. horizontal scan across the image and illustrates profiles of poor focus and sharp focus of a magnified fine line.

FIG. 2 illustrates the magnified fine line 38 above a curve 46 representing a poorly focused image such as may be made in a best manual initial focus, and a second curve 48 representing a sharp focus of the line 38. Both curves 46 and 48 are somewhat exaggerated plots of optical intensity measured by the photodetector 30 vs. horizontal scan across the line 38 and are provided to explain the derivation of "edge values" shown in the curve of FIG. 3. The curve 46 representing a poor focus of the dark line 38 is the type that will appear fuzzy near the edges of the line 38. The light portions of the object adjacent the dark line produces high output intensities at the points 50 in both curves 46 and 48. As the housing 26 of FIG. 1 is scanned across the image at the focal point, the intensities of the poorly focused image gradually deteriorate and will reach the minimum at some point 51 within the boundaries of the line. On the other hand, the properly focused image represented by the curve 48 is shown to have nearly vertical sides 52 and rapidly drops from the maximum intensity 50 to the minimum 53 as the scanning slit 28 in the housing 26 of FIG. 1 crosses the edges of the line image 38.

Each of the curves 46 and 48 of FIG. 2 has a slope, the sharpest focus occurring when the slope of the curve is vertical, or has a value of infinity. A value of "goodness of focus", a measurement that will hereafter be described as "edge value", is on the other hand proportional to the reciprocal of slope so that the sharpest focus occurs at the lowest edge value, which is numerically defined as:

$$\text{edge value } (E.V.) = \left| K \frac{1}{dp/dx} \right|,$$

where
 K is a scaling constant, and
 dp/dx is a brightness rate of change with horizontal scan distance.

Figure 3:
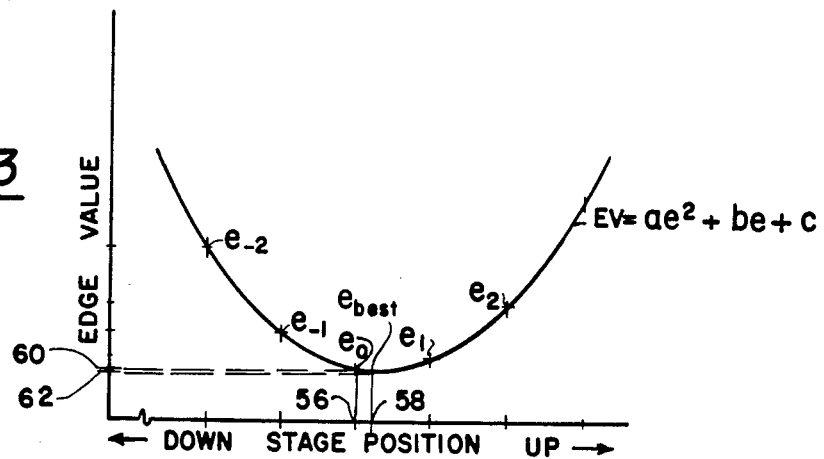
FIG. 3 is a typical second order curve of edge values plotted against vertical stage positions.

FIG. 3 illustrates a curve of Edge Value vs. vertical stage positioning. In the method employed in the invention, a minimum of three edge values are measured at different but known stage positions; however, five values are measured at equally spaced stage positions in the preferred embodiment described herein.

Figure 4:
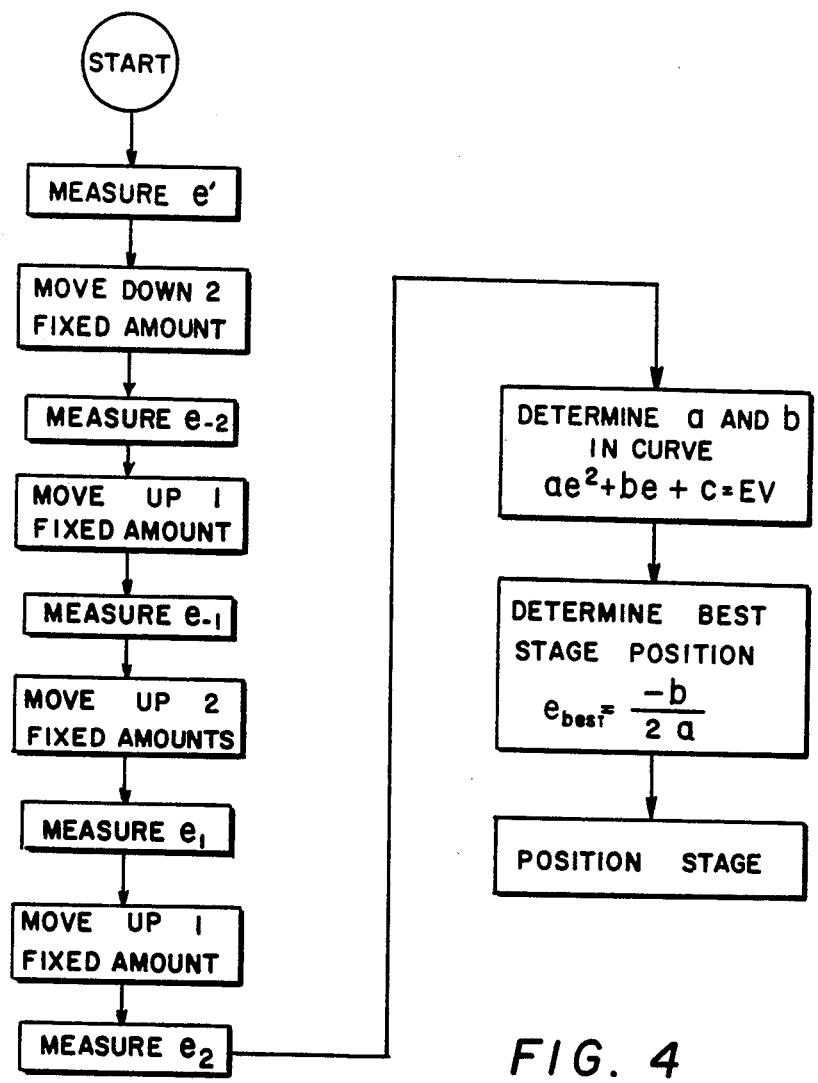
FIG. 4 illustrates the steps in the method for achieving fine focus in accordance with the invention.

FIG. 4 illustrates the steps involved in measuring edge values and in finally locating the proper vertical stage position for sharpest focus. Initially, the operator adjusts the vertical focusing knob 18 for best manual of inital focus. A horizontal scan is made by driving the slit 28 across the image 38 of the specimen and the computer 20 determines the edge value, $e_o$, at this initial position. While any convenient scanning sequence may be used, the sequence employed in the preferred embodiment first drives the stepping motor 16 to drop the stage two predetermined steps of 0.45 micrometers each where a second scan measurement is taken and the resulting edge value, $e_{-2}$, is determined. The stage is then raised one predetermined fixed step by the stepping motor 16 and a third measurement is made by the photodetector behind the lead screw driven scanning slit 28. The resulting edge value, $e_{-1}$, is determined and the stage 12 is then raised by two predetermined fixed steps to measure the edge value, $e_1$, and then raised one step to measure the fifth edge value, $e_2$.

The five measured edge values may be plotted as shown in FIG. 3 and results in a curve that can be approximated by the second order curve, $$E.V. = ae^2 + be + c.$$

The values of the coefficients, a, b, and c, may then readily be determined by the "least squares best fit" method well known to statisticians and mathematicians. The equation for deriving the coefficients of a second order curve plotted from five values of "e" is:

$$a = \frac{1}{7} e_{-2} - \frac{1}{14} e_{-1} - \frac{1}{7} e_0 - \frac{1}{14} e_1 + \frac{1}{7} e_2$$

and $$b = -\frac{1}{5} e_{-2} - \frac{1}{10} e_{-1} + \frac{1}{10} e_1 + \frac{1}{5} e_2.$$

As previously mentioned, the sharpest focus occurs at a minimum edge value. Therefore, to locate the proper vertical stage position for sharpest focus, it is only necessary to locate the lowest point on the curve of FIG. 3, and this may readily be done by differentiating the second order equation and setting it equal to zero, to thereby locate the zero slope of the curve.

The first derivitive of the second order equation, $E.V. = ae^2 + be + c$, is: $d(E.V.)/dx = 2ae + b$.

The coefficient, c, is a constant representing the height of the curve of FIG. 3 above the abscissa and can be neglected. If we place the first derivitive equal to zero and solve for the stage position, e, the result will properly locate the precise stage position for sharpest focus of the system.

Thus, if $2ae_{best} + b = 0$, then $e_{best} = -b/2a$.

FIG. 4 lists the steps in the method described above. In the preferred embodiment, the computer 20 controls the operation of the two stepping motors 16 and 36, reads and stores in memory 58 the output values of the photodetector 30, measures the edge values for each of the vertical stage positions, determines the optimum vertical stage position for sharpest focus by the least squares best fit method discussed above, and positions the stage to that optimum position. It will be noted that the equations are not difficult or complex and that manual computations may be readily made if preferred.

It will be noted from an inspection of the curve of FIG. 3 that the initial manual stage setting 56 resulted in an edge value that was extremely close to the optimum value produced at the precise focusing position 58 and was well within the "depth of focus" range of the optical system. It is to be realized that a manual focus adjustment cannot be precise and that the differences between the initial edge value 60 and optimum edge value 62, while close, results in vertical stage positions 56 and 58, respectively, that are spaced a substantial amount so that manual focusing can seldom be precise. It will also be noted that the maximum data for establishing the curve of FIG. 3 is obtained at stage positions displaced from the optimum focus position 58 and at points corresponding to wide variations in edge value where very small stage movements will greatly alter the amount of fuzziness in the observed image. Thus, the second order curve developed from out-of-focus data is used to accurately locate the precise distance of an object for optimum focus on that object.

As previously mentioned, the fine focusing system may be used with any type of optical or electro-optical instrument requiring focusing adjustments and employing an image detector, such as, for example, optical or electron-optical microscopes, optical or television camera systems, photosensitive film devices, etc.

Figure 5:
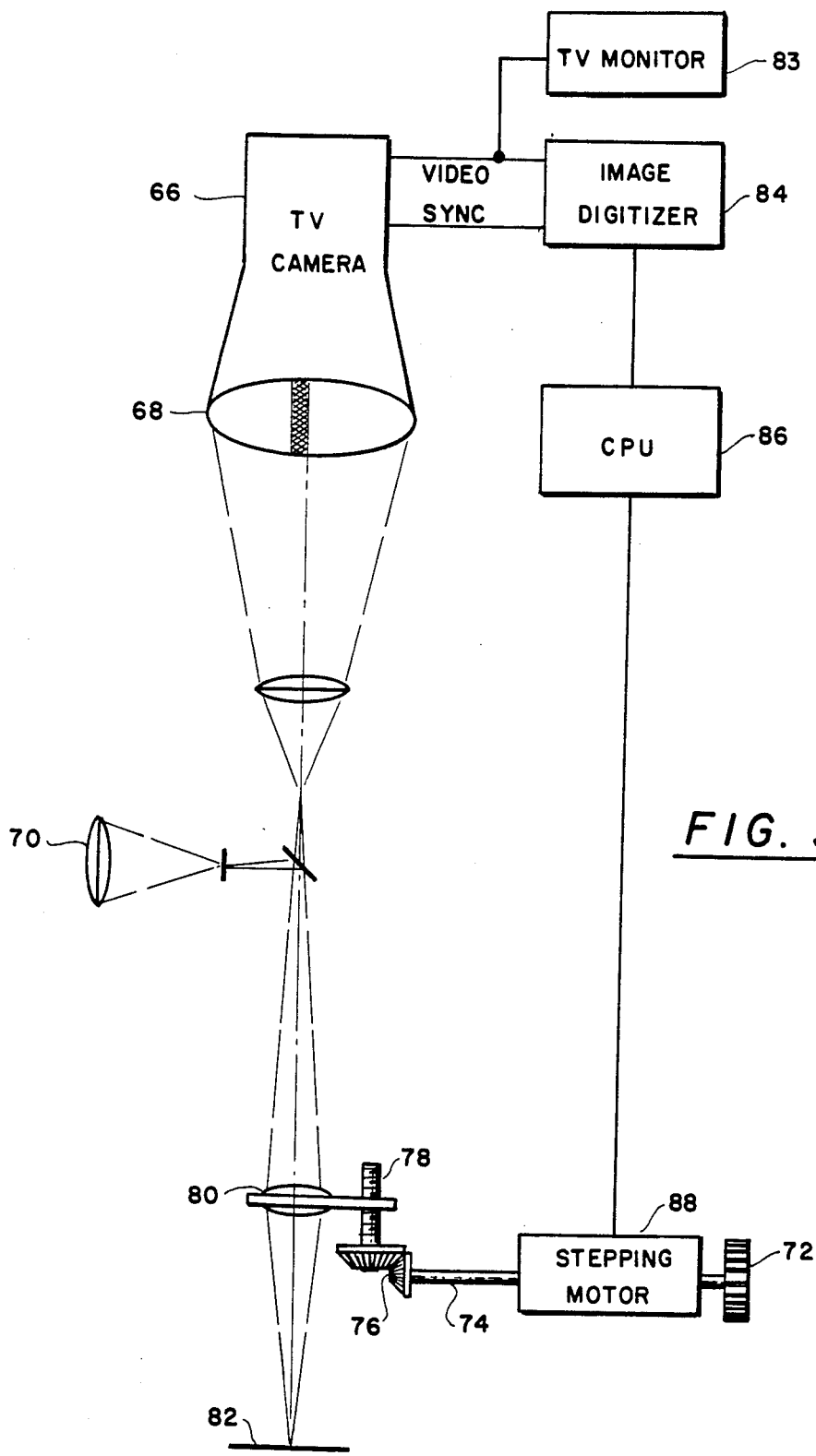
FIG. 5 is a schematic view of a television camera employing the focusing system of the invention.

FIG. 5 is a schematic diagram illustrating the fine focusing system in a television camera 66 having a target face 68 that may be that of a vidicon tube, a solid state CCD panel, or similar type of target. Viewing through an eyepiece 70, or into a TV monitor 83, the operator or cameraman or a secondary focus system may manually or automatically focus to a best visual focus by adjustment of knob 72 for rotating the shaft 74, bevel gears 76, and lead screw 78 to adjust the objective lens 80. The image of a discernible feature on the viewed object 82 is thus focused on the target face 68 of the television camera 66.

The camera is coupled to an image digitizer 84 that is capable of converting one or more raster scan lines from the camera video signal into a digital form for the CPU 86. These raster scan lines are analygous to the scan lines of the photomultiplier tube described in connection with FIG. 1; however, in the case of raster scanning, there may be many lines and the effective scan used for focusing may be a composite from several individual raster lines. Scan position is accurately determined by the CPU 86 from the synchronizing signals from the television camera and the memory circuitry associated with the CPU coordinates the scan position information with image intensity data across each scan in a manner similar to that described in connection with the optical microscope system of FIG. 1.

What is claimed is:

1. A method for the automatic fine focusing of an optical instrument having an image scanning means, said method comprising the steps of:

selecting an initial focusing distance between the instrument and an optically discernible feature on the object of interest;

operating the image scanning means of said instrument to make a plurality of at least three scans across said feature, one of said scans being made substantially at said initial focusing distance, each remaining scan in said plurality being made at different known distances, each different from that of said initial focusing distance;

noting the variations in measured light intensities as a function of position across the length of each scan of said plurality;

determining an edge value (E.V.) for each scan in said plurality from said intensity variations as a function of said scan positions, a plot of said determined edge values as a function of corresponding distance, e, being a curve following the form: $E.V. = ae^2 + be + c$;

determining the values of the coefficients, "a" and "b" in ssaid curve; and determining optimum focal distance, "$e_{best}$", between said instrument and said object from the equation, $e_{best} = -b/2a$.

2. The method claimed in claim 1 including the further step of adjusting the distance between said instrument and said object to said optimum focal distance.

3. The method claimed in claim 1 where the step of determining the values of the coefficients is made by the least squares best fit method.

4. The method claimed in claim 1 wherein said optical instrument is a microscope, and wherein said image scanning means includes a photodetector behind a slit for measuring light intensities across a magnified image of a specimen mounted on a stage having adjustment means for focusing said microscope.

5. The method claimed in claim 4 wherein the microscope image scanning means and stage adjustment means is controlled by a digital processor.

6. The method claimed in claim 5 wherein the steps of noting the variations in measured light intensities, determining an edge value, and determining optimum focal distance is performed by said digital processor.

7. The method claimed in claim 3 wherein said optical instrument is a camera.

8. The method claimed in claim 7 wherein said camera is a television camera.

9. Apparatus for automatically adjusting an associated optical system to optimum focus upon an object after an initial focus upon a fixed feature on said object, said apparatus comprising:
   first electrical driving means for varying the focal distance between the optical system and the fixed feature on said object;
   scanning means located at the focal plane of said optical system, said scanning means including second electrical driving means for scanning a narrow transparent slit across an image of said fixed feature on said object;
   detecting means responsive to the illumination transmitted by said transparent slit for measuring variations in illumination intensities as said slit is scanned across said image, and for generating electrical output signals indicative of said measured variations; and
   processing means responsive to said electrical output signals for controlling the operation of said first and said second electrical driving means, said processing means determining edge values (E.V.) of a scan made at the initial focus and at each of a plurality of scans taken at differing focal distances different from that of said initial scan, a plot of said edge values as a function of said focal distances being a curve of the form, $E.V. = ae^2 + be + c$, said processing means determining therefrom the optimum focal distance, $e_{best}$, by first determining the values of the coefficients, "a" and "b", by the least squares best fit method then determining focal distance from the equation, $e_{best} = -b/2a$, and then adjusting said first electrical driving means to the point of said optimum focal distance.

10. The apparatus claimed in claim 9 wherein said optical system is part of a camera.

11. The apparatus claimed in claim 9 wherein said optical system is part of an optical microscope.

12. The apparatus claimed in claim 9 where said optical system is part of a scanning densitometer.

13. Apparatus for automatically adjusting the optical system of an associated television camera to optimum focus upon an object after an initial focus upon a feature on said object, said apparatus comprising:
   electrical driving means coupled to the optical system for varying the focus between the television camera and the object;
   digitizing circuitry coupled to the output of the television camera for converting television synchronizing signals and detected image signals into corresponding digital signals;
   digital processing means coupled to the output of said digitizing circuitry for controlling the operation of said electrical driving means, said processing means determining from said digitizing synchronizing signals and from the intensity of said detected image signals edge values of television raster scans made substantially at the initial focus and at each of a plurality of raster scans taken at differing focal distances different from that of said initial focus, a plot of said edge values as a function of said focal distances being a curve of the form, edge value $(E.V.) = ae^2 + be + c$, said digital processing means determining therefrom the optimum focal distance, $e_{best}$, by first determining the values of the coefficients, "a" and "b", by the least squares best fit method then determining focal distance from the equation, $e_{best} = -b/2a$, and adjusting said electrical driving means to the point of said optimum focal distance.

* * * * *